May 8, 1951  A. A. AVETA  2,551,922
CAM RELEASED CLUTCH
Filed Jan. 8, 1946  2 Sheets-Sheet 2
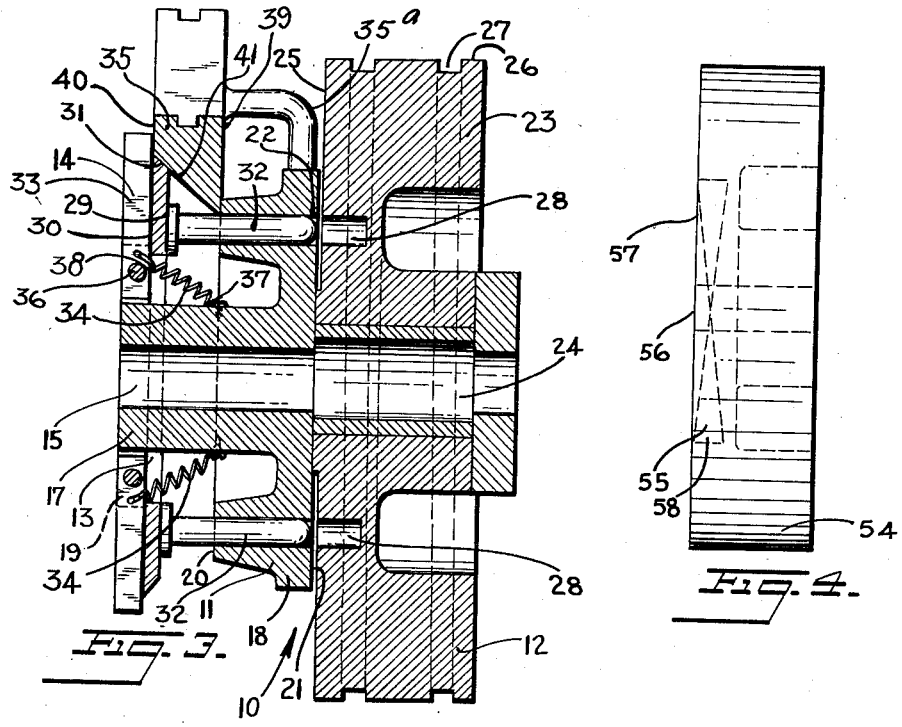
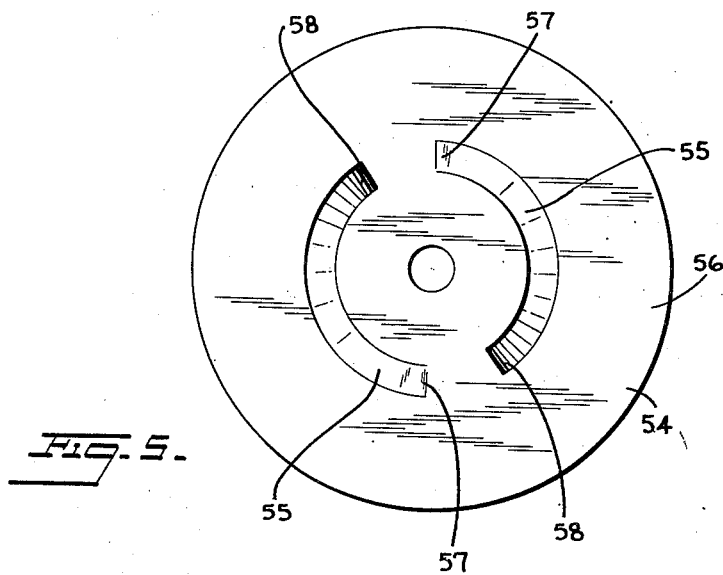
INVENTOR
ALBERT A. AVETA
BY
ATTORNEY Patented May 8, 1951

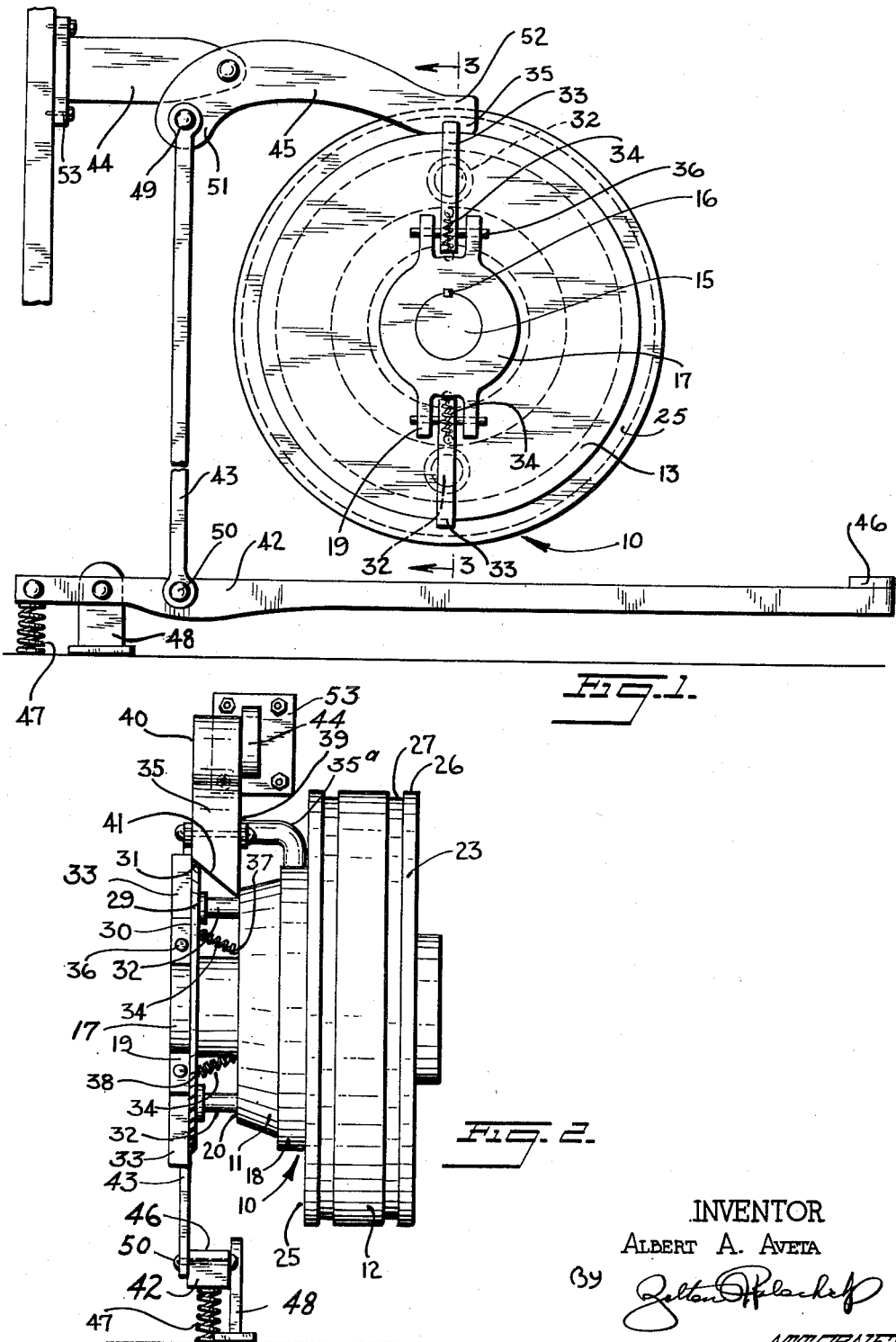

2,551,922

UNITED STATES PATENT OFFICE 2,551,922

CAM RELEASED CLUTCH

Albert A. Aveta, New York, N. Y.

Application January 8, 1946, Serial No. 639,806

1 Claim. (Cl. 192—89)

This invention relates to clutches, and more particularly to a treadle activated clutch to engage co-axial driving and driven members.

An object of the invention is to provide engaging and disengaging means for a mechanical device having a driving member and a co-axial driven member, the means to be activated by a treadle which causes the members to engage when it is depressed.

This and other objects are accomplished by providing a plate co-axial with the driving and driven members, the plate having two pins which extend through openings in the driving member and are capable of engaging slots in the driven member. The plate is rotated by the driving member and is also adapted to be moved linearly along its axes to permit engagement and disengagement of the pins. A spring is secured to the plate acting to retain the pins in engagement, and a cam is provided to act on the plate against the action of the spring normally to retain the pins disengaged. When a treadle is depressed, the cam is moved away from the plate and the spring acts on the plate to engage the pins.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 1 is a rear view of a mechanical device embodying the invention herein.

Fig. 2 is a side view of the device shown in Fig. 1.

Fig. 3 is a sectional view along the line 3—3 of Fig. 1.

Fig. 4 is a side view of a modified driven member of the mechanical device.

Fig. 5 is a rear view of the driven member shown in Fig. 4.

In the drawings and in the specification, a mechanical device 10, shown in Figs. 1 to 3 inclusive, is comprised of a driving member 11, a driven member 12, an annular plate 13 coaxially aligned with the driving and driven members and means 14 for linearly operating the plate along its axis.

The driving member 11, which is mounted on a rotatable shaft 15 and secured thereon by a key 16, is provided with a hub 17 having a wheel 18 extending from one end and a pair of forked bearings 19 at the other end. The bearings are opposingly positioned around the hub. The wheel 18 is formed with a rear face 20 adjacent the bearings, and a front face 21 opposite the rear face. A pair of holes 22, which extend through the wheel 18 from the rear and the front face are axially parallel and symmetrically positioned around the shaft 15.

The driven member 12 is comprised of a pulley 23 mounted on a shaft 24 which is co-axial with the shaft 15. The pulley 23 is provided with a rear face 25 adjacent the front face 21 of the driving member and an end face 26 formed with grooves 27 for engagement by a belt. The side face 25 is provided with a pair of holes 28, co-axial with the shaft 24, which matches and is of the same diameter as the holes 22.

The annular plate 13, positioned about the hub 17, is formed with a front face 29 adjacent the rear face 20 of the wheel 18 and a rear face 30 adjacent the forked bearings, and a peripheral face 31 sloping toward the axis as it extends from its rear to its front face. The front face 29 of the plate is provided with a pair of pins 32 which are co-axial with and slidably extend into the holes 22 of the wheel 18. The pins are long enough to extend into the holes 28 of the driven member 12 when the plate 13 is moved toward the rear face 20 of the wheel 18.

The means 14 for linearly operating the plate 13 along its axis is comprised of a pair of pivoted arms 33, a pair of springs 34 and a cam 35. Each of the arms 33 is pivotally secured at one end in one of the forked bearings 19 by a pin 36 and is formed with an arcuate face 37 at its other end and is held against the rear face 30 of the plate 13 by one of the springs 34. Each spring 34 is secured at one end 37 to the hub 17 adjacent the rear face 20 of the wheel 18, and at its other end 38 to the arcuate face of one of the arms 33 outward of the respective pivot pin 36 tending to urge the plate 13 forward and its pins toward and into the holes of the driven wheel 12. The cam 35 is formed with a front face 39 adjacent the rear face 20 of the wheel 18, a rear face 40 opposite its front face, and an end or cam face 41 adjacent and in contact with the sloping end face 31 of the plate. Interposing the arms 33 between the plate 13 and the springs 37 results in a smoother operating clutch device in which the action of the plate 13 is not abrupt.

The cam 35 is provided with an L-shaped extension 35ª adapted to engage the outer periphery of the wheel 18, when the cam is in the down or engaging position. This extension 35ª acts as a braking means.

To operate the cam, a treadle control means is provided which is comprised of a treadle bar 42, connecting rod 43, holding bracket 44 and a rotatable arm 45. The treadle bar 42 is provided with a foot rest 46 at one end and a spring 47 at its other end, and is rotatably supported intermediate its ends by a bearing 48. The connecting rod 43 is pivotally secured at its end 49 to the rotatble arm 45 and at its other end 50 to the treadle bar 42 between the bearing 48 and the foot rest 46. The rotatable arm 45 is pivotally supported intermediate its ends by the bracket 44 and is secured at its end 51 to the connecting rod 43 and at its other end 52 is provided with the cam 35. The bracket 44 is rigidly secured by screws 53 to a housing (partially shown).

The device is operated by manipulating the foot rest 46 of the treadle bar 42. When the foot rest 46 is depressed against the force of the spring 47, the connecting rod 43 rotates the arm 45, disengaging the cam and permitting the springs 34 to force the plate 13 forward to engage its pins 32 in the holes 28 of the driven member 12, so that the plate 13 and the driving and driven members rotate together and as a unit. When the force holding the foot rest 46 down is released, the spring 47 rotates the treadle bar 42 lifting the connecting rod 43 and lowering the cam into an engaging position with the plate 13, whereby the plate and its pins 32 are retracted and the driving and driven members are disengaged.

In the variation shown in Figs. 4 and 5, a driven member 54 has two diametrically opposed arcuate slots 55 concentric with its axis and in a rear face 56 opposing the front face 21 of the driving member. The slots are so located that the pins 32 of the plate can be advanced thereinto. The depth of each of the arcuate slots increases uniformly from one end 57 to its other end 58. In all other respects the driven member 54 is similar to the driven member 12 heretofor described.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a mechanical drive having a driving member provided with a pair of slidably mounted pins engageable with complementary holes formed in a driven member for locking the driving member and the driven member together for unitary movement, a concentric hub extending from the face of the driving member opposed to the face adjacent the driven member, an annular plate surrounding said hub and having the pins mounted thereon, a pair of opposed forked bearings formed on said hub, a pair of arms each pivoted at one end on one of said forked bearings and having its free end engaging the face of said plate opposed to the face from which the pins extend, resilient means operating between said arms intermediate of their ends and said hub urging said plate into a position in which the pins are extended into the holes of the driven member, said plate having its peripheral face sloped toward the driven member and the axis of rotation of the members, and a foot operated cam engaging the sloped peripheral face of said annular plate for urging said plate against the action of said resilient means into a position in which the pins will be disengaged from the holes of the driven member, said resilient means comprising coil springs each connected at one of their ends to an intermediate portion of one of said arms and at the other of their ends to said hub.

ALBERT A. AVETA.

REFERENCES CITED

The following references are of record in the file of this patent:

UNITED STATES PATENTS

| Number | Name | Date |
| --- | --- | --- |
| 213,710 | Tees | Mar. 25, 1879 |
| 231,828 | McCord | Aug. 31, 1880 |
| 260,175 | Durfee | Oct. 6, 1882 |
| 286,556 | Proctor | Oct. 9, 1883 |
| 796,205 | Graham | Aug. 1, 1905 |
| 991,785 | Klocke | May 9, 1911 |
| 1,066,750 | Oakes | July 8, 1913 |
| 1,112,443 | Floeter | Oct. 6, 1914 |
| 1,311,299 | Therien | July 29, 1919 |
| 1,405,001 | Reichelt | Jan. 31, 1922 |
| 2,249,187 | Steiner | July 15, 1941 |
| 2,399,821 | Murphy | May 7, 1946 |

FOREIGN PATENTS

| Number | Country | Date |
| --- | --- | --- |
| 556,053 | Germany | Aug. 5, 1932 |